(12) United States Patent
Fichtlscherer et al.

(10) Patent No.: US 8,698,353 B2
(45) Date of Patent: Apr. 15, 2014

(54) METHOD FOR OPERATING A REDUNDANT SYSTEM AND SYSTEM THEREFOR

(75) Inventors: Martin Fichtlscherer, Amberg (DE); Tobias Gramolla, Kümmersbruck (DE); Mario Maier, Ensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 370 days.

(21) Appl. No.: 13/246,337

(22) Filed: Sep. 27, 2011

(65) Prior Publication Data

US 2012/0074785 A1     Mar. 29, 2012

(30) Foreign Application Priority Data

Sep. 27, 2010 (EP) .................................... 10180074

(51) Int. Cl.
*H02J 1/00*     (2006.01)
(52) U.S. Cl.
USPC ........................................................... 307/63

(58) Field of Classification Search
USPC ........................................................... 307/63
See application file for complete search history.

(56) References Cited

U.S. PATENT DOCUMENTS

| 7,512,727 B2 * | 3/2009 | Kreb et al. ...................... 710/69 |
| 7,646,620 B2 * | 1/2010 | MacDonald et al. ......... 363/142 |

FOREIGN PATENT DOCUMENTS

| DE | 10 2004 03969 | 3/2006 |
| EP | 1 701 230 | 9/2006 |

\* cited by examiner

*Primary Examiner* — Rexford Barnie
*Assistant Examiner* — Joseph Inge
(74) *Attorney, Agent, or Firm* — Cozen O'Connor

(57) ABSTRACT

A method for safely detecting in two redundantly-configured output modules a possible wire break of a load, wherein during a switch-off test of a first module, a current test is performed in the respective other module and a binary test is performed in the switched-off module. The binary test determines whether the voltage switched off through the respective other module is also reaching the module with the binary tests over corresponding connection paths.

10 Claims, 3 Drawing Sheets

METHOD FOR OPERATING A REDUNDANT SYSTEM AND SYSTEM THEREFOR

BACKGROUND OF THE INVENTION

1. Field of the Invention

The invention relates to automation technology and, more particularly, to a method implemented in a redundant system for supplying a load with a voltage, where a first output voltage for controlling the load is switched using a first output of a first output module and a second output voltage is switched to the first output module using a second output of a second output module.

The invention further relates to a system for redundant supply of a voltage to a load, comprising a first output module having a first output, which is connected by a first connection to a first load terminal of the load, where a second load terminal of the load is connected by a second connection to a ground terminal of the first output module to form a first electrical current path. The second output module is connected in a similar manner to the load by the second output to achieve the redundancy, similarly to the first output module, so that a second electrical current path is formed, i.e., the system has a redundant structure through the connection of the two output modules.

2. Description of the Related Art

It is known to employ methods, systems or modules in, for example, digital output modules that are typically used in safety-oriented devices, such as in automation technology. In particular, detecting a broken wire plays an important role. On the one hand, the safety of the process must be guaranteed, while on the other hand the safety of life and limb, for example, the safety of the people operating the process, must be guaranteed. In these safety applications, redundant connection of the output modules continues to play a further important role.

In the area of automation technology, redundancy means the presence of functionally identical or comparable resources of a technical system. Here, at least two systems or two output modules are thus present to guarantee redundant operation.

Starting from a redundantly connected system of two automation modules, it is known that, for example, two digital output modules for driving a load are connected in parallel by their outputs to the load. As a result, if one output module fails, then the transfer of power for the load is guaranteed by the other module. Both output modules are equipped with a wire break detection system in such cases. In the event that one of the two modules detects a wire break to the load, then the module provides a notification of the wire break to the other module over a separate communication interface installed between the redundantly-connected output modules. Here, the disadvantage is that additional wiring for communication must be installed between the modules.

It is also necessary to supply the modules with an operating voltage. As a result, it is further disadvantageous that with redundant connection, especially with fluctuations of the supply, a detected wire break can be diagnosed prematurely although no actual wire break is actually present.

SUMMARY OF THE INVENTION

It is therefore an object of the present invention to dispense with additional wiring for communication between two modules for redundantly-connected output modules.

This and other objects and advantages are achieved in accordance with the invention by a method for operating a redundant system for supplying a load with a voltage, where a first output voltage is connected to a load by a first output of a first output module and a second output voltage is connected to the load by a second output of a second output module for controlling the load. The method is preferably employed in a system having the first and second output modules, which have their respective outputs connected in parallel to the load. In a first step, a test of the first electrical current path from the first output across the load is performed in the first output module with a first measurement device belonging to this module, and in the second output module a test of a second electrical path from the second output across the load is performed with a second measurement device belonging to the second output module.

In a second step, the following applies. If the result of the test is that a measured value of the current of the respective electrical current path lies below a threshold value, then the output voltage of the output module at which an undershoot of the threshold value has been established by the test result is switched off. Furthermore, in a third step, a binary test is performed by a read-back signal, which is read in over a read-back input that is connected to the output, where a binary test is performed by this read-back input in the output module in which the output voltage was switched off. The binary test delivers a logical one if there is still a voltage present at the output and a logical zero if no voltage is present at the output. In this case, in a next step, a test result of this readback signal is evaluated. For the test result "0" an error message is generated and for the test result "1" the binary test is continued cyclically for a predetermined duration of a wait time. Within the period of the wait time, the output module is operated with the still switched-on output voltage such that its output voltage is switched off, where this switching off is registered by the output module that performs the binary test and this subsequently switches its output voltage back on. As a result, the output supplies the load over the electrical path connected to its output, where a check is performed by the measurement device belonging to this output module to determine whether a current is flowing, and in the event of no current flowing an error message is generated.

The method of the invention is advantageously used to avoid an incorrect diagnosis of a broken wire with redundantly operated modules. For example, different load voltages, small load currents, independent redundant power supplies, possible voltage drops on the supply lines can result in a wire break message or an error message being mistakenly generated. Low load current or, for example, different supply voltages can result in different current distribution between the two modules on the two electrical current paths.

These electrical current paths are connected redundantly, preferably in parallel. If, however, a current is now to be measured on one of the electrical current paths, where the measured value of this current measurement undershoots a predetermined threshold value, an error message that indicates a wire break is present could be output in an erroneous manner. This error message would be forwarded in a conventional manner over a separate communication connection to the other module in each case. However, in accordance with the invention, the physical communication connection between the two output modules is dispensed with.

In accordance with the method of the invention, a measured value is provided with the first test of the current, where the measured value reflects the respective current through the electrical current path that is defined by the respective module. If the current determined in this way lies below a specific threshold value, in principle, a wire break or an error could exist in the electrical connection for the respective current path. Without notifying this to the respective other module over an additional communication connection, the module in which the undershooting of the threshold value was established by the test result switches off its output voltage.

In order to verify this result and to determine whether a wire break is really present, a binary test is performed in the other module in which the undershooting of a threshold value is not present. The binary test corresponds to scanning the respective output for the presence of a voltage.

The two outputs of the first and second output modules are connected in parallel to the load. As a result, in the module in which the binary test is running it is now possible to establish whether the electrical current path at least up to the load from this module is still in order, because the parallel connection of the two output modules means that the output voltage of the other module is now also present over this electrical current path at the output of the module with the suspected threshold undershoot.

If the line is intact, then a logical "1" is returned by the read-back input. If the line is defective, however, then a logical "0" is returned. For a test result of "0", it can then be said with certainty that a wire break is present and an error message is generated. Usually, this error message is used to activate a function relating to security of such a redundant system. This type of mutual scanning advantageously enables an additional communication line between the two modules to be dispensed with.

In a further advantageous embodiment of the method, the check of the respective electrical current path is performed alternately by the associated measurement device. In a similar way to a flip-flop, the testing of the measured value of the current of the respective electrical current path is performed alternately with a predeterminable clock rate. If the predeterminable period of time for this alternate testing is selected to be small enough, once again the security of a redundantly-operating system for supplying a load is increased.

To avoid incorrect diagnoses and to further increase the security, the testing by the measurement device is likewise undertaken alternately in one of the output modules and the binary test is performed in the respective other output module.

In order to detect a possible wire break up to the load and also beyond the load, where the test is performed through the test of the current over the first or second electrical current path, a wire break test is performed of a first connection or of a third connection up to a first load terminal beyond the load and a second connection or a fourth connection that are connected to a second load terminal.

Thus, if a load is to be switched on by a redundantly-operated system with two output modules, both modules initially switch their output to active. Here, both output modules perform a wire break test independently of one another, preferably by current measurement. In particular, with small load currents or different supply voltages, this can result in a different current distribution between the two output modules. This can lead to the first output module accepting the entire current and that current no longer flows in the second output module. Subsequently, the second output module switches its output off and "reads" back a logical "1", despite its driver being switched off, i.e., the first output module is switched on and no error is present. Despite this read-back result, the second output module now reads back a logical value continuously over its output and awaits a specific time period for a switch-off test or a dark current test of the first module. Within this specific defined time period, the first module thus performs the dark current test. Here, the second module is constantly reading back the output. Consequently, the second module detects this switch off, and switches its output on. In the event of the presence of an actual wire break, even after the acceptance of the load by the respective module, no current will flow and the respective module can notify an actual wire break error.

The object of the invention is also achieved by a system for redundant supply of a load with a voltage, where the system comprises a first output module with a first output that is connected by a first connection to a first load terminal of the load and a second load terminal of the load is connected by a second connection to a ground terminal of the first output module to forms an electrical current path. A second output module that is connected by a third connection to the third load terminal of the load and the second load terminal is connected by a fourth connection to a ground terminal of the second output module to form a second electrical current path. In this case, it is necessary for each of these output modules to preferably have a measurement device for testing a current flow by the first or the second electrical current path and for providing a measured value. Furthermore, an evaluation device is present in each module for evaluating the measured value. Moreover, each output module is provide with a switching device for switching a first output voltage to the first output or a second output voltage to the second output, where a read-back input is present in each case that is connected to the first output or the second output, and a respective evaluation device includes a respective read-back input and is also configured to perform a binary test that generates a logical "1" if there is a voltage present at the output and generates a logical "0" if no voltage is present at the output. In the case of a test result of "0", an error message is generated. In the case of a test result of "1", the binary test is cyclically continued for a predetermined duration of a wait time. Within the predetermined period of the wait time, the output module with the voltage still switched on is configured for its output voltage to be switched off, where the output module that performs the binary test is configured to register this test and subsequently re-switch on its output voltage and thereby assume supply of the load. With a measurement device belonging to this output module, a test is performed to determine whether a current is flowing. In the event of no current flowing, an error message is generated.

The presently contemplated embodiment of a redundant system comprising at least two output modules advantageously enables elimination of additional communication between the two output modules for wire break detection. Consequently, as a result of the specially configured output module of the system, the two modules can scan each other over the existing current paths connected to the load.

In accordance with an advantageous embodiment of the system, the switching device is configured in conjunction with the evaluation device such that the switching off of the output voltage follows a temporally predetermined course. In relation to the already mentioned advantage that an additional communication line can be dispensed with, because of the temporally-known/pre-specified sequence of the switching processes in each of the modules, it is no longer necessary to constantly poll a wire break monitoring system of the individual modules, for example, from a higher-ranking control system, because the first module has knowledge of a time window between two switch-off tests of the second module. Advantageously, if no polling for a wire break is necessary, the module can perform other circuit tests, such as overload supervision, dark current test or bit pattern test, especially preferably using fault-tolerant modules.

The deterministic behavior, i.e., knowledge that a temporally-known or pre-specified execution behavior in one of the modules is known, where future events can be uniquely determined by preconditions, is preferably achieved for the output modules by the evaluation device being configured such that after a temporally predetermined behavior the output module switches the assigned switches such that the switching off overvoltage at the output is used for a dark current test. A known status of the respective other module is thus taken as known. If, however, this known status is not obtained, it is possible to conclude a malfunction has occurred.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the system for redundant supply of a load, in which.

DETAILED DESCRIPTION OF THE PRESENTLY PREFERRED EMBODIMENTS

Figure 1:
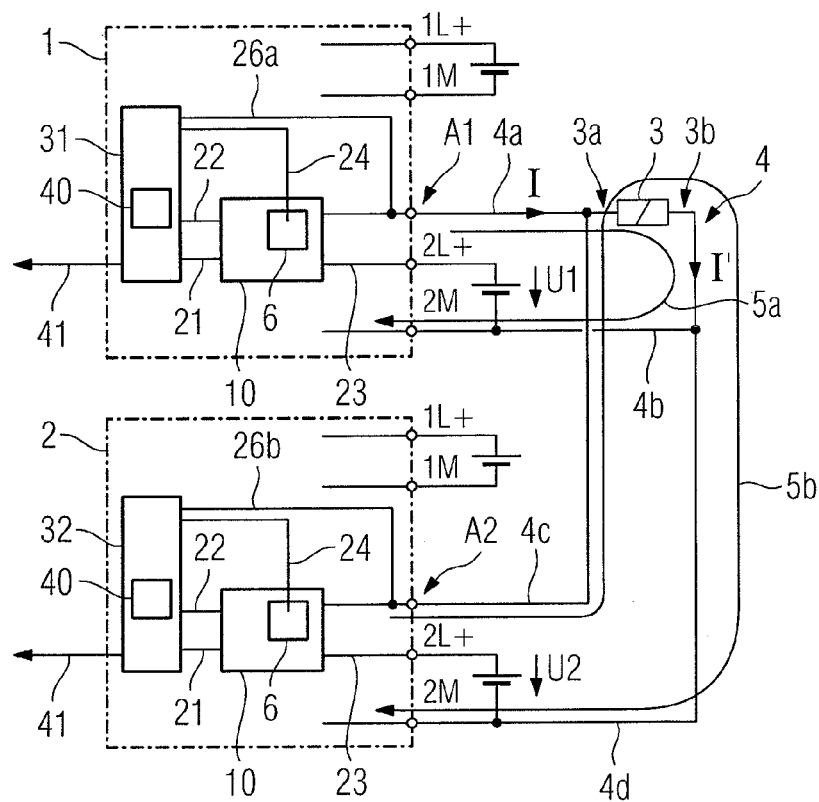
FIG. 1 is a schematic block diagram of a system with two redundantly-connected output modules in accordance with the invention.

FIG. 1 is a schematic diagram illustrating a first output module 1 having a first output A1 and a second output module 2 having a second output A2, which are connected together into a system for redundant supply of a load 3. The output modules 1, 2 are redundantly connected in parallel to the load by their outputs A1, A2. The load 3 can, for example, be a relay, an LED, a fire alarm or generally a component for a safety application. An electrical connection leads to the load 3, which divides itself for a first electrical current path into a first connection 4a and a second connection 4b. The first connection 4a connects the output A1 to a first load terminal 3a of the load 3. The second connection 4b connects a second load terminal 3b to a ground terminal 2M of the output module 1. The first and second connections create a first electrical current path 5a over the load 3.

A second electrical current path 5b over the load 3 is created with a third connection 4c and a fourth connection 4d, with the third connection 4c being connected to the second terminal A2, which is likewise connected to the first load terminal 3a. To close the circuit for the second electrical current path 5b, the fourth connection 4d is connected by a first end to a ground terminal 2M of the second output module 2a and by a second end to the second load terminal 3b of the load 3. This type of connection represents a redundant circuit. This redundant parallel circuit guarantees that even if one output module 1, 2 should fail, a current I' through the load can be assumed by each module 1, 2.

The output modules 1, 2 each have terminals for an operating voltage of the output modules 1, 2. These operating voltage terminals 1L+, 1M are each connected to an operating voltage source. The output modules 1, 2 are designed identically in their construction. Consequently, the basic internal construction of the output module 1, 2 will be explained below using the first output module 1 as an example.

The first output module 1 includes a switching device 10 for switching the first output A1. The internal structure of the switching device 10 is described in greater detail in FIG. 2. A measurement device 6 for measuring a current I is also arranged in the switching device 10. In order to control the switching device 10, the first output module 1 has a first evaluation device 31, which is configured to flag a diagnostic error 40 within the first control device 31 and, on confirmation of the diagnostic error 40, issue a fault message 41. The switching device 10 has a first input 21, a second input 22 and a third input 23. The first input 21 is used for controlling a first switch 11 (see FIG. 2), the second input 22 is used for controlling a second switch 12 (see FIG. 2) and the third input 23 is used for connecting a first voltage U1 that is switched by the switching device 10 over the output A1 to the load 3. A current I flowing as a result of the connected first voltage UI can flow out from the first output A1 through the load 3 to a ground input 2M of the first output module and/or a ground output 2M of the second output module 2. This circuit represents the redundant circuit.

A diagnostic output 24 of the switching device 10 is connected to the first evaluation device 31 and can thus notify the evaluation device 31 whether it has detected a diagnostic error 40 that is then flagged in the first evaluation device 31. Using the presently contemplated embodiment of the first output module 1, a method for detecting a wire break of the electrical connection 4 for the load 3 can be performed, where the first voltage U1 for controlling the load 3 is provided by the first output A1 of the first output module 1 and the second voltage U2 provided by the second output A2 of the second output module.

The first electrical current path 5a is checked in the first output module 1 by the first output A1, where within the first output module 1 the current I is evaluated and a measured value obtained therefrom is subjected to a test criterion, and where fulfillment of the test criterion is initially flagged in a first output module 1 within the first evaluation device 31 as a diagnostic error 40.

In addition, the first evaluation device 31 is connected to a read-back input 26a, where the read-back input 26a is connected to the first terminal A1. In relation to the second output module 2, a read-back input 26b is connected to the second output A2 and the second evaluation device 32.

With the respective readback input 26a, 26b, in the respective output module 1, 2, a signal present at the respective outputs A1, A2 is read back.

In this case, the respective evaluation device 31, 32 is configured with the respective readback input 26a, 26b to perform a binary test that delivers a logical "1" when a voltage is present at output A1, A2. The read-back input 26a, 26b delivers a logical "0" if no voltage is present at output A1, A2. With a test result of "0", an error message is generated, and with a test result of "1" the binary test is continued in cycles for a predetermined period of a wait time TW (see FIG. 3).

The method for operating a redundant system for supplying the load 3 with a voltage is executed as follows. The first output voltage U1 is switched on by the first output A1 and the second voltage U2 is switched on by the second output A2 for controlling the load. In the first and second output module 1, 2, a test of the first electrical current path 5a or of the second electrical current path 5b is performed by a measurement device 6 belonging to the respective output module 1, 2.

If the result of the test is that the measured value of the current value of the respective electrical current path 5a, 5b lies below a threshold value, then the output voltage U1, U2 of the output module 1, 2 in which the test result has established the undershooting of the threshold value is switched off.

Using the read-back input 26a, 26b and the evaluation device 31, 32, a binary test is now performed on the switched-off output that delivers a logical "1" if there is still a voltage present at this output and a logical "0" is delivered if there is no longer any voltage at this output.

If the test results have produced a "0", then an error message is created, and it is possible to safely conclude that a wire break is present.

However, if the test result produced a "1", then a voltage is still present at the respective output at which the binary test was performed through the redundant connection of the respective other module to this output.

The binary test is now continued for a predetermined period of a wait time TW in cycles, where within the period of the wait time TW the output module is driven with the output voltage still switched on such that its output voltage U1, U2 is switched off. This switching off is performed by the output module 1, 2 that performs the binary test. Consequently, the respective output module 1, 2 thus assumes supply of the load 3. A check is performed with the measurement device 6 belonging to the respective output module 1, 2 to determine whether a current is flowing, where in the event of no current flowing an error message is generated.

The redundant system in accordance with the presently contemplated embodiments thus operates in accordance with the principle of when one of the two output voltages U1, U2 is switched off completely, a current flow can only still occur through the respective switched-on module. Consequently, however, when a current flow that is large enough continues to be present there cannot be a wire break.

The method and the output modules for the redundant system in accordance with the disclosed embodiments of the invention has the advantage that low load currents or different supply voltages are able to be tolerated. Different power distribution between the two output modules 1, 2 can result and this can lead, for example, to a threshold for the wire break detection being undershot in the first output module 1 and thus a corresponding diagnosis would be incorrectly issued.

Figure 2:
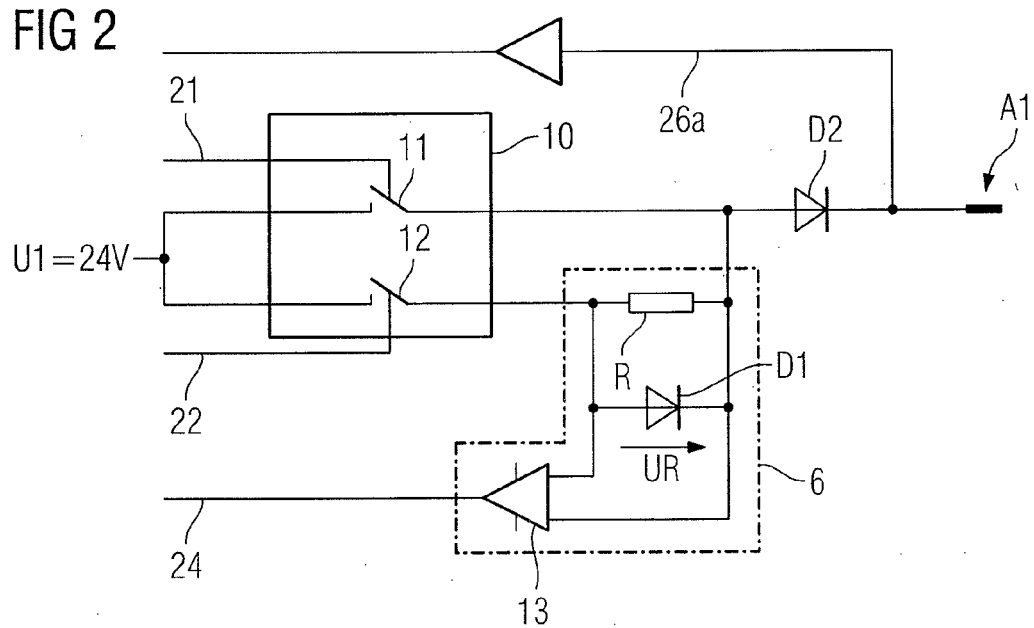
FIG. 2 is a detailed schematic block diagram of control of an output in accordance with the invention.

The first output A1 and the measurement device 6 of the switching device of FIG. 1 are shown in detail in FIG. 2. Here, the first output A1 is connected by electrical connection to a line and a signal amplifier to form a read-back input 26a at this location. The switching device 10 includes a first switch 11 and a second switch 12. The first switch 11 is controlled to a first input 21 such that it can switch from an open position into a closed position. In this closed position, the first switch 11 switches the first voltage U1, for example, 24 V, to the output A1. The second switch 12 is accordingly controllable by a second input 22, so that the second switch 12 also switches from an open position into a closed position and likewise through-connects the first voltage U1. The second switch 12 ensures that a resistor R, which is a component of the measurement device 6, is switched into the current path to the first output A1. In this series circuit of the resistor R and the output A1, a voltage UR can drop at a resistor R. The voltage UR is fed to a comparator 13 that evaluates the voltage UR or the current flowing through the resistor and subjects it to a test criterion. An undershoot of the measured value of the voltage drop UR below a specified threshold value is used as the test criterion. If the voltage drop UR does not correspond to the threshold value set beforehand, the comparator 13 is configured to issue the diagnostic message 40 described with respect to FIG. 1 at a diagnostic output 24.

A second diode D2 is arranged in the output path of the first output A1 to decouple the outputs A1, A2 with the redundant connection of the output modules 1, 2 from one another.

Figure 3:
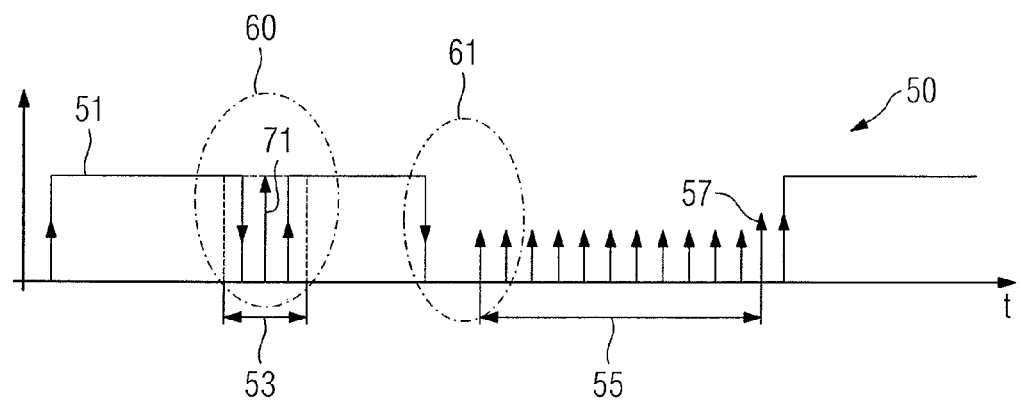
FIG. 3 is a graphical plot illustrating the timing behavior of the redundantly-connected output modules in accordance with the invention.
Figure 3:
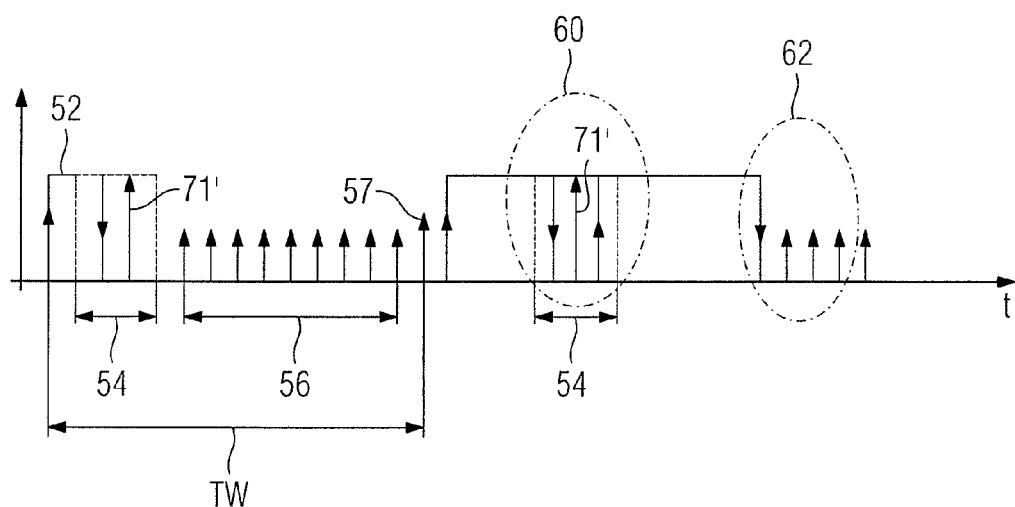

FIG. 3 is a graphical plot illustrating a flow diagram 50 of the timing sequences of the voltage curves 51 at the first output A1 and of the voltage curve 52 at the second output A2 of the respective output modules the 1, 2. The curves are mapped over the time t. The two circled areas 60 each represent an error case. The circled areas 61 and 62 each involve a test switch-off 61 of the first module 1 and a test switch-off 62 of the second output module 2.

Starting from an idle status, the two output modules 1, 2 each connect their respective voltage to their outputs A1, A2. The voltage curve 51 at the first output A1 and the voltage curve 52 at the second output A2 typically rises from 0 volts to 24 volts. For example, a dashed line is to be seen in the voltage curve 52 even after some time. This dashed line has an expansion area 54, which corresponds to a test that is performed with the measurement device 6 of the second module 2. In this period 54, the current is detected by the measurement device 6 in the second module. It is assumed for the typical case that although the voltage curve 52 has risen to 24 volts, the current flow through the second electrical current path was not sufficient and thereby a second error message 71' is triggered in the second output module 2. For a test of this second error message 71', the voltage is entirely switched off at the second output module A2. Consequently, the voltage curve 52 decreases down again from the typical 24 volts to 0 volts. With the switching off of the second output voltage U2, a binary test having duration 56 starts in the second output module 2. This binary test is shown in the flow diagram by consecutive arrows pointing upwards, which means that a check is repeatedly performed cyclically by a corresponding read-back input 26a, 26b at the respective output to determine whether a voltage is present.

During the period 56, a possible wire break error can occur in the voltage curve 51. If during the binary test 56 of the second output module 2 the voltage U1 at the first output module 1 were also to fall to "0", then the binary test also delivers a "0" during the period 56 and the system issues a wire break error message.

The error case 60 in the first voltage curve 51 should now not be further taken into account. For further description of the flow diagram, it is assumed that the error case 60 has not occurred in the voltage curve 51.

After a wait time TW has elapsed, the binary test 56 in the second output module 2 ends and an error notification is also generated. Here, however, the first output module A1 is still performing a dark current test during the wait time TW, i.e., a test switch-off 61 of the first module, where with this first test switch-off the first voltage of, for example, 24 volts is switched off to 0 volts. This test switch-off 61 is registered by the second output module 2 by the read-back input 26b and the second output module 2 reacts by assuming the load 57. Here, second output module 2 switches its output voltage U2 back to the load 3. Switching on and switching off of the voltage curves 51, 52 is indicated in each case by a small arrow in the rising edge or the falling edge. Here, the first module 1 has now switched off its first output voltage U1. As a result, it now possible to perform a binary test with the duration 55. This switching off and switching on of the output voltages is undertaken alternately. Consequently, if an output module is performing its switch off test 61, 62, the respective other module has to switch on its output voltage again.

In the respective area of the switched on output voltage, an error can be discovered by the above-described current measurement method in accordance with the disclosed embodiments of the invention.

A wire break error can be discovered in two different ways. On the one hand, a wire break error is discovered by a current being measured through the respective current paths 5a and 5b, and if the current undershoots a threshold value, a first indicator for an error is present. It is, however, not possible to be certain that the current value undershoot, for example, has come into being as a result of different load currents or different load voltages. As a result, a binary test is performed in the respective other module in an opposing sense with respect to the current test. Thus, the binary test scans a respective output of a respective module, and checks to determine whether a voltage U1 or U2 is present at this output. In any event, for the redundant system in accordance with the disclosed embodiments, where the load is connected redundantly in parallel with the two output modules 1, 2, a voltage must always be present at the respective outputs. Here, it is not the actual output voltage, but based on the particular type of configuration that the output voltage of the respective other module is sampled by the readback input.

In another embodiment, during a switch off test of a first module, a current test is performed in the respective other module and a binary test is performed in the switched off module to safely detect a possible wire break to a load 3 with redundantly connected output modules 1, 2. Here, the binary test is used to determine whether the voltage switched on through the respective other module also reaches the module with the binary test over the corresponding connection paths.

Figure 4:
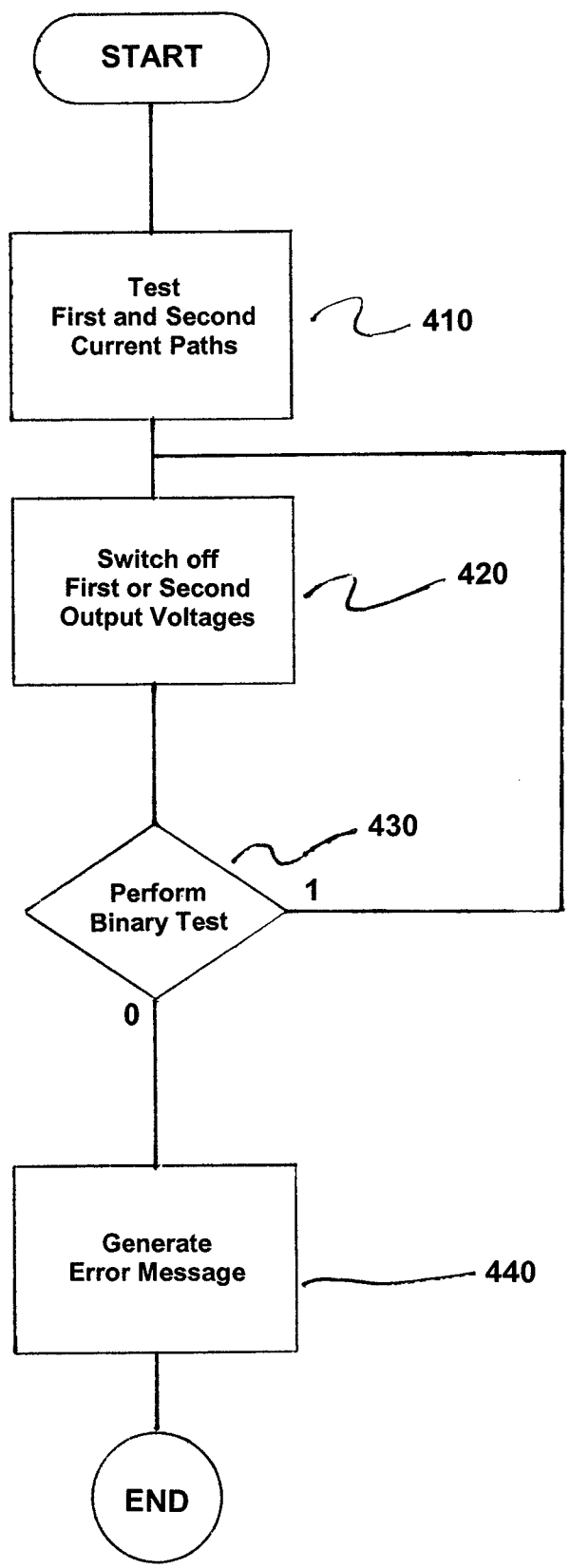
FIG. 4 is a flow chart of a method in accordance with an embodiment of the invention.

FIG. 4 is a flow chart of a method for operating a redundant system for supplying a load with a voltage, where a first output voltage is connected by a first output of a first output module and a second output voltage is connected by a second output of a second output module to control a load. The method comprises performing, by a first measurement device included in the first module, a test of a first electrical current path at the first output through the load and performing, by a second measurement device included in the second output module, a test of a second electrical current path from the second output through the load, as indicated in step 410.

The first or second output voltages of the first and second output modules at which an undershoot of a threshold value was established by the test result is switched off if a result of the test is that a measured value of the current of a respective electrical current path is below a threshold value, as indicated in step 420.

A read-back input connected to the first and second outputs, performs a binary test in the output module of the first and second output modules in which the first or second output voltages of the first and second output modules was switched off, as indicated in step 430. Here, a logical one is delivered if the voltage is still present at the first or second outputs and a logical zero is delivered if no voltage is present at the first or second output.

An error message is generated for the test result of zero and for a test result of one, the binary test is continued in cycles for a predetermined duration of a wait time, such that within a duration of the wait time the output module of the first and second output modules having the output voltage still switched on is operated such that its output voltage is switched off, as indicated in step 440.

In accordance with the disclosed embodiments of the method of the invention, the switching off is registered by the output module of the first and second output modules performing the binary test and subsequently this re-switches on its output voltage to assume supplying the load over an electrical current path connected to its output. A test is thus performed by the first measurement device associated with the first output module being performed to determine whether a current is flowing and, in an event of no current flowing, an error message is generated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a redundant system for supplying a load with a voltage, a first output voltage being connected by a first output of a first output module and a second output voltage being connected by a second output of a second output module, to control a load, the method comprising:

performing, by a first measurement device included in the first output module, a first test of a first electrical current path at the first output through the load and performing, by a second measurement device included in the second output module, a second test of a second electrical current path from the second output through the load;

switching off one of the first or second output voltages of one of the first and second output modules if a result of an associated one of the first and second tests is that a measured value of the current of a respective one of the first and second electrical current paths is below a threshold value;

performing, by a read-back input connected to the first and second outputs, a binary test in the one of the first and second output modules, the binary test delivering a logical one if the voltage is still present at a respective one of the first and second outputs and delivering a logical zero if no voltage is present at the respective one of the first and second outputs;

the read-back input generating, if a logical zero is delivered, an error message and continuing, if a logical one is delivered, the binary test in cycles for a predetermined duration of a wait time;

within the duration of the wait time, operating the other of the first and second output modules having the output voltage still switched on such that the output voltage thereof is switched off;

registering the switching off of the other one of the first and second output modules by the one of the first and second output modules performing the binary test and switching, in response to the registering, the output voltage of the one of the first and second output modules back on to assume supplying the load over the associated one of the first and second electrical current paths; and performing a test by the measurement device associated with the other of the first and second output modules after switching the output voltage thereof back on to determine whether a current is flowing and, in an event of no current flowing, generating an error message.

2. The method as claimed in claim 1, wherein the first and second tests of the first and second electrical current paths are alternately performed by the first and second measurement devices of the first and second output modules.

3. The method as claimed in claim 1, wherein the first and second tests are performed by the measurement device of the one of the first and second output modules and the binary test is performed in the other of the first and second output modules.

4. The method as claimed in claim 2, wherein the first and second tests are performed by the measurement device of the one of the first and second output modules and the binary test is performed in the other of the first and second output modules.

5. The method according to claim 1, where the first output module is connected to the load by a first connection and a second connection and the second output module is connected to the load by a third connection and a fourth connection, said method further comprising performing a wire break test of one of:
the first connection and the second connection using the first electrical current path; and
the third connection and the fourth connection using the second electrical current path.

6. A system for redundant supply of a load with a voltage, comprising:
a first output module having a first output connected by a first connection to a first load terminal of the load and a second load terminal of the load being connected by a second connection to a ground terminal of the first output module to form a first electrical current path;
a second output module having a second output connected by a third connection to the first load terminal of the load, the second load terminal being connected by a fourth connection to a ground terminal of the second output module to form a second electrical connection path;
each of the first and second output modules further comprising:
a measurement device configured to check a current flow over the first or the second electrical current paths and to provide a measured value;
an evaluation device configured to evaluate the measured value;
a switching device configured to switch a first output voltage to the first output or a second output voltage to the second output;
a read-back input arranged in the evaluation device and connected to the first output or the second output;
each the respective evaluation devices being configured to:
control the switching device of an associated on of the first and second output modules to switch off the output voltage of the associated one of the first and second output modules if a result of the current flow check is that a measured value of the current of a respective one of the first and second electrical current paths is below a threshold value;
perform a binary test in the associated one of the first and second output modules in response to the switching off, the binary test delivering a logical zero if a voltage is present at an output of the associated one of the first and second output modules, delivering a logical zero if no voltage is present at the output of the associated one of the first and second output modules, and generating an error message if a logical zero is delivered, the binary test being continued cyclically for a predetermined duration of a wait time for a test if a logical one is delivered, the other of the first and second output modules having the output voltage that is still switched on during the wait time is configured so that the output voltage of the other of the first and second output modules is switched off during the wait time; and
wherein the associated one of the first and second output modules is configured to register that the other one of the first and second output modules is switched off and subsequently switch on the output voltage of the associated one of the first and second output modules to assume supply of the load, the measurement device of the associated one of the first and second output modules being configured to perform a further test after being switched back on to determine whether a current is flowing and to generate, in an event of no current flowing, an error message.

7. The system as claimed in claim 6, wherein the switching device in the each of the first and second output modules is respectively configured in conjunction with the evaluation device in the each of the first and second modules such that the switching off of the output voltage of the first and second modules follows a predefined time sequence.

8. The system as claimed in claim 6, wherein the switching device in the each of the first and second output modules is configured in conjunction with the evaluation device in the each of the first and second output modules such that the error message is detected as a wire break message.

9. The system as claimed in claim 7, wherein the switching device in the each of the first and second output modules is configured in conjunction with the evaluation device in the each of the first and second output modules such that the error message is detected as a wire break message.

10. The system as claimed in claim 6, wherein the system comprises a fault-tolerant programmable logic system.

* * * * *